United States Patent [19]

Harper

[11] Patent Number: 5,779,024

[45] Date of Patent: Jul. 14, 1998

[54] CLEANING DEVICE FOR ENDLESS CONVEYOR

[76] Inventor: Christopher R. Harper, Field View, Wade House Lane, Drax Hales, Drax, Selby, Great Britain

[21] Appl. No.: 656,365

[22] PCT Filed: Dec. 22, 1994

[86] PCT No.: PCT/GB94/02810

§ 371 Date: Jun. 19, 1996

§ 102(e) Date: Jun. 19, 1996

[87] PCT Pub. No.: WO95/17341

PCT Pub. Date: Jun. 29, 1995

[30] Foreign Application Priority Data

Dec. 22, 1993 [GB] United Kingdom ............... 9326155
Jun. 22, 1994 [GB] United Kingdom ............... 9412482
Aug. 15, 1994 [GB] United Kingdom ............... 9416431

[51] Int. Cl.⁶ .................................................. B65G 45/18
[52] U.S. Cl. ........................................................ 198/496
[58] Field of Search ............................................. 198/496

[56] References Cited

U.S. PATENT DOCUMENTS

| 766,013 | 7/1904 | Baldwin ................ 198/496 |
| 1,431,770 | 10/1922 | Ayres ................ 198/496 X |
| 2,083,864 | 6/1937 | Puckett ................ 198/496 |
| 2,652,920 | 9/1953 | Bowman et al. . |
| 3,957,155 | 5/1976 | Enchelmaier . |
| 4,960,200 | 10/1990 | Pierce ................ 198/496 X |

FOREIGN PATENT DOCUMENTS

| 1147833 | 11/1957 | France . |
| 1204136 | 10/1965 | Germany ................ 198/496 |
| 0235119 | 10/1987 | Japan ................ 198/496 |
| 1093283 | 6/1967 | United Kingdom . |
| 2067497 | 7/1981 | United Kingdom . |
| 2271540 | 4/1994 | United Kingdom . |

*Primary Examiner*—James R. Bidwell
*Attorney, Agent, or Firm*—Madson & Metcalf

[57] ABSTRACT

A cleaning device for an endless conveyor of the type comprising an endless belt having an upper conveyor run and a lower return run which are guided over rollers at each end of the conveyor. The cleaning device is arranged to exert a cleaning action on the underside of the return run of the conveyor belt and to be driven directly or indirectly by the linear motion of the conveyor belt and/or from a drive train coupled with the conveyor belt. The cleaning device includes a rotatable brush having its axis of rotation extending below the return run and transversely of the direction of travel of the return run. The brush has cleaning elements extending outwardly of the brush axis and in which the outer ends of the elements are engageable with the underside of the return run upon rotation of the brush. A cradle is located at one end of the brush on which the brush is rotatably mounted. The spacing of the brush axis relative to the underside of the return run can be adjusted. Biasing devices are provided to urge the brush axis towards the underside of the return run to press the outer ends of the cleaning elements into cleaning contact therewith.

11 Claims, 14 Drawing Sheets

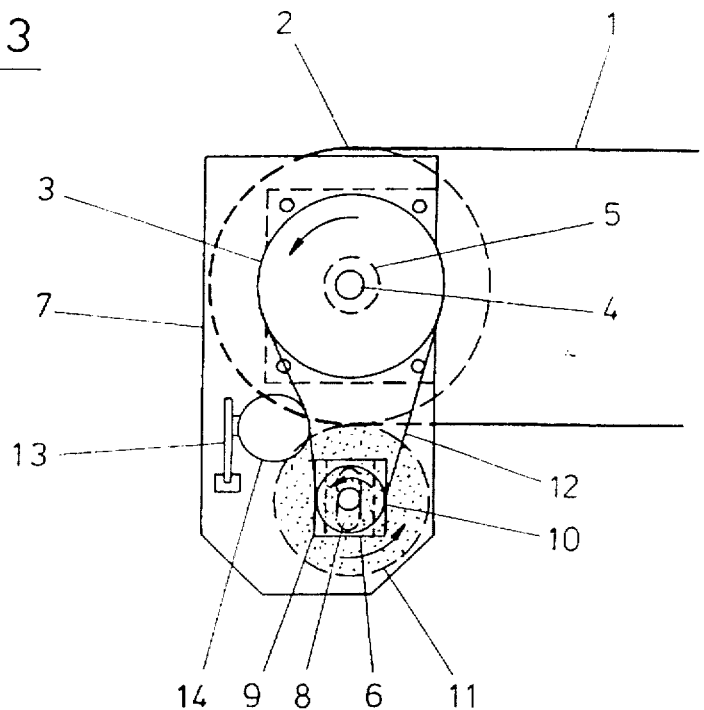
FIG. 3
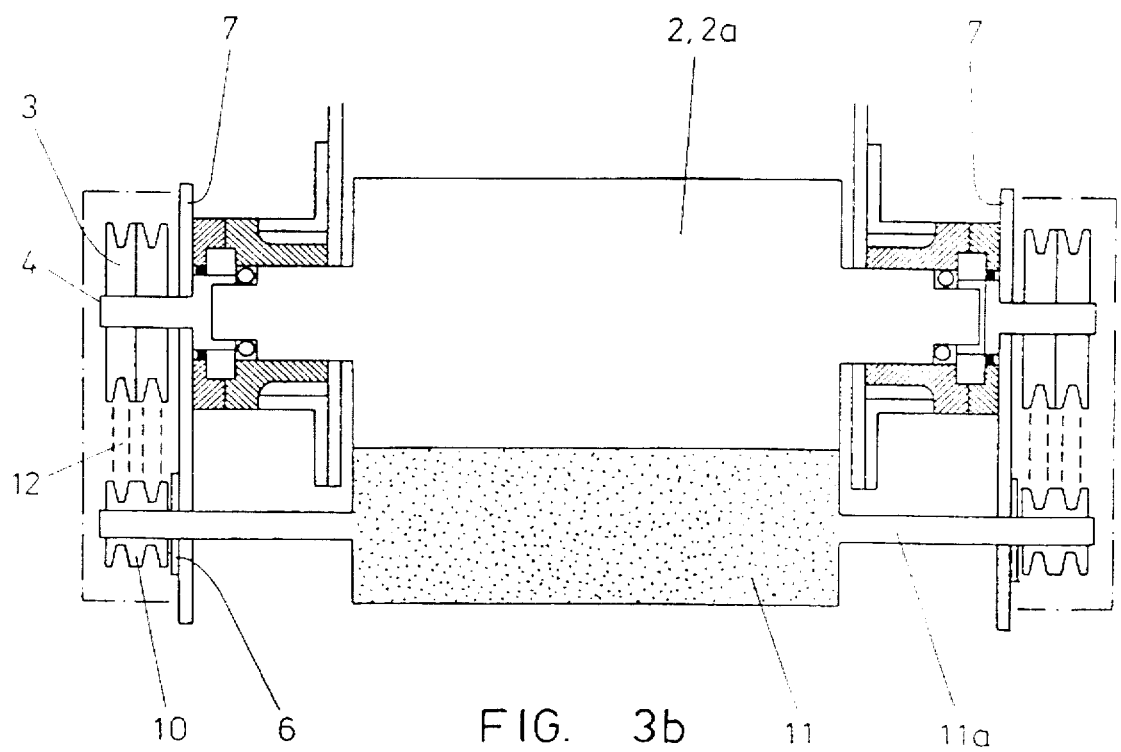
FIG. 3a
FIG. 3b

FIG. 4
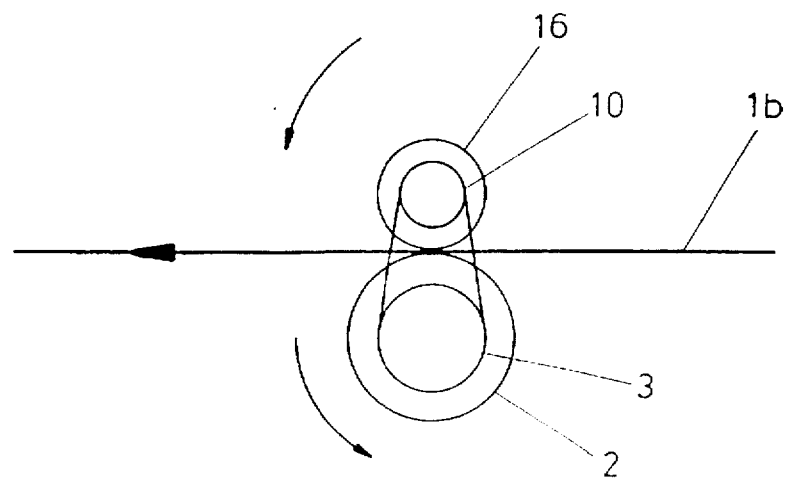
FIG. 4a
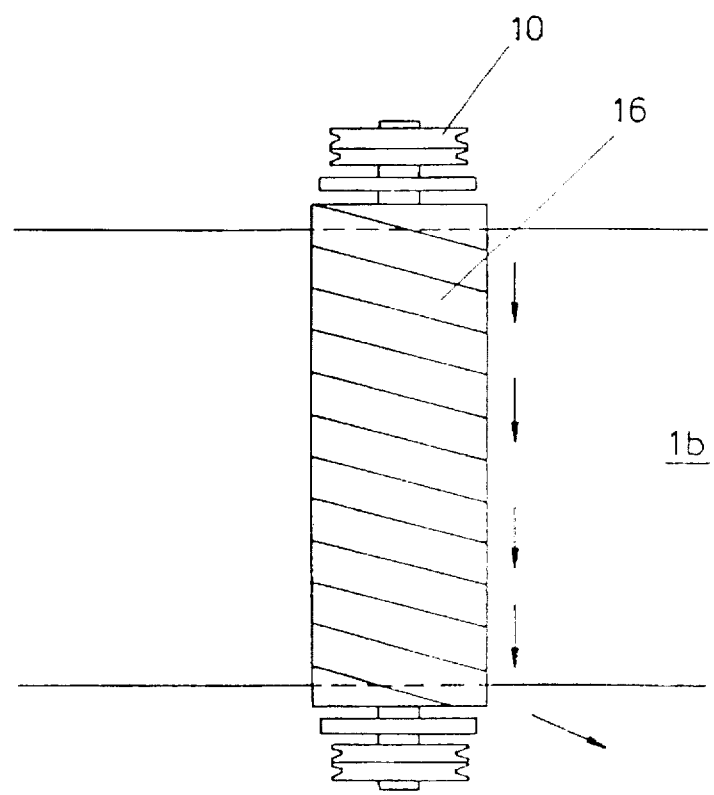
FIG. 4b

FIG. 5
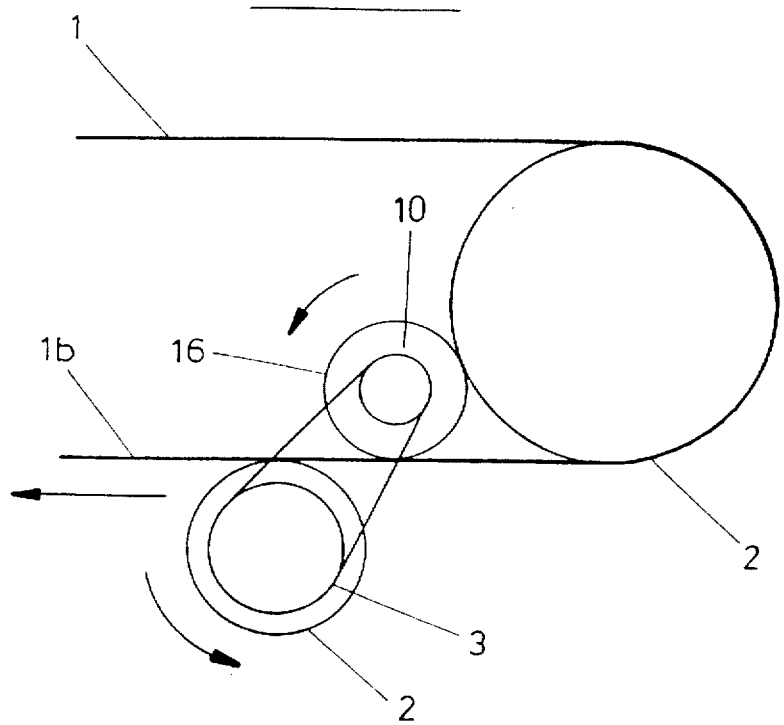
FIG. 5a
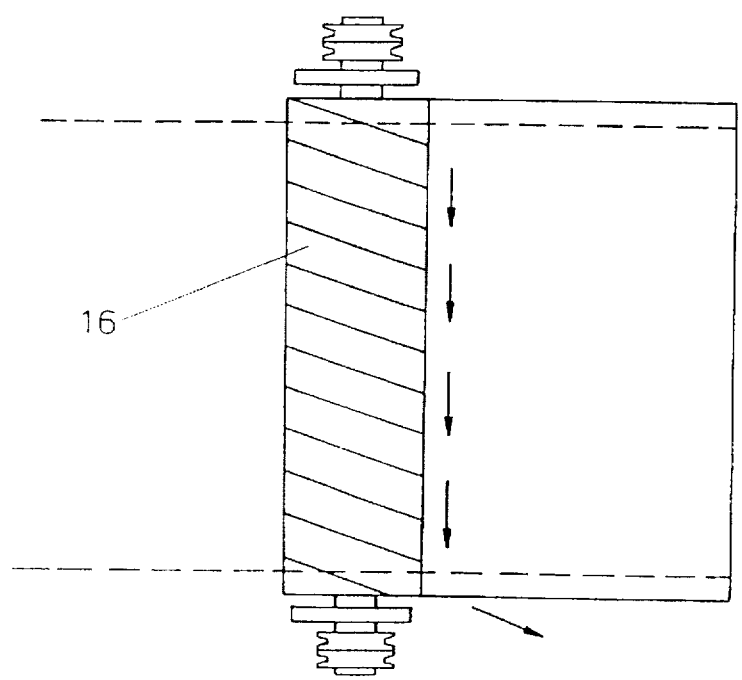
FIG. 5b

FIG. 6
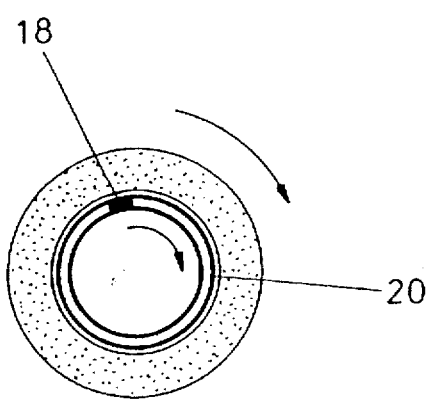
FIG. 6a
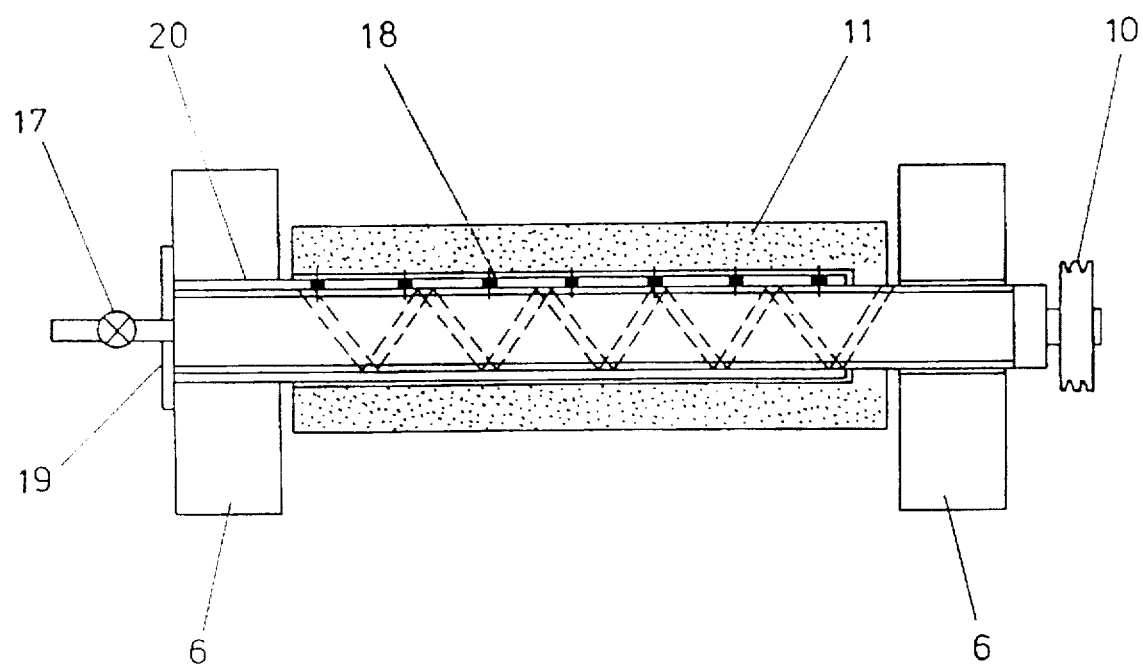
FIG. 6b

CLEANING DEVICE FOR ENDLESS CONVEYOR

This invention relates to a cleaning device for an endless conveyor, said conveyor being of the type comprising an endless belt or the like having an upper conveyor run and a lower return run which are guided over drive/driven rollers at each end of the conveyor, and usually also via one or more intermediate idler rollers.

For convenience hereinafter an endless conveyor of the above type will be referred to as a "conveyor belt".

Conveyor belt cleaning devices are used on most conveying systems to remove unwanted or redundant materials. They can also be employed to transfer material from the conveyor belt to a specific location along the length of the conveyor.

Most conveyor belt cleaning devices are of an automatic scraper-edge design. These rely upon the linear motion of a conveyor belt passing over a stationary wiper blade, which subsequently removes or diverts the materials as required.

More effective cleaning devices have also been designed which comprise a rotating cylindrical element, generally of a brush type of construction, and which is rotated at speed and in a direction opposite to the direction of travel of the conveyor belt.

However, these brush type of cleaning devices are relatively expensive, since they are required to be rotated either via an electro-mechanical transmission or from some other form of prime mover.

A third type of cleaning device is known which sweeps a brush element laterally across the conveyor belt, i.e. at 90° to the plane of the conveyor, but this system is restrictive in its mode of operation, speed and size. The brushing action is not uniform over the conveyor belt width, and its speed is, at best, only a direct 1:1 ratio of the conveyor belt speed. The design requires the rotating element to be off-set with respect to the centre line of the conveyor belt, which in turn produces a cleaning device of greater diameter than the actual belt width.

The invention seeks to provide a cleaner device which derives its power input from the motion energy of the endless belt which is to be cleaned, and which desirably is able to exert a self-adjusting cleaning engagement with the underside of the return run of the endless belt. The self-adjusting engagement may allow the cleaning device a) to compensate for wear and/or b) to adjust its position to suit particular cleaning loads and conditions.

According to one aspect of the invention there is provided a cleaning device for an endless conveyor of the type comprising an endless belt having an upper conveyor run and a lower return run which are guided over rollers at each end of the conveyor, said cleaning device being arranged to exert a cleaning action on the underside of the return run of the conveyor belt and to be driven directly by the linear motion of the conveyor belt, and in which the cleaning device comprises:

- a cradle adapted to be mounted pivotally adjacent to the path of travel of the return run of the endless belt;
- a drive roller rotatably mounted on said cradle and engageable frictionally with the upper surface of the return run to be rotated by the linear motion of the belt;
- a generally cylindrical cleaner also rotatably mounted on said cradle and having cleaning elements extending outwardly of the axis of rotation of the cleaner and to be engageable with the lower surface of the return run;
- drive means interconnecting said roller and said cylindrical cleaner, and operative to rotate the cleaner in a direction such that the tips of the cleaning elements move in an opposite direction to the linear movement of the return run as the elements carry out a cleaning operation; and
- biasing means arranged to apply a biasing moment to the cradle about its pivot axis to urge the cylindrical cleaner upwardly and thereby press the tips of the cleaning elements into engagement with the lower surface of the return run.

Preferably, the axis of the drive roller coincides substantially with the pivot axis of the cradle.

The biasing means may comprise any suitable arrangement, including tension or compression springs, but preferably comprises a counterweight mounted on the cradle at an opposite side of the pivot axis of the cradle to the cleaner. The counterweight may be adjustably mounted on the cradle to permit variation in the biasing moment applied to the cradle. This may be achieved preferably by mounting the counterweight in slides provided on the cradle, and which allow the counterweight to be adjusted toward or away from the axis of the cradle according to requirements.

A damper may be provided to retard any oscillation of the cradle about its pivot axis, and especially upon start-up.

The cylindrical cleaner may take any convenient form, suitable for carrying out a cleaning action on the surface of an endless conveyor belt, and in one preferred form comprises a rotary brush having a cylindrical core with brush elements extending outwardly of the core. The brush elements may be wound helically onto the cylindrical core, and this has been found to provide an advantageous cleaning action on the surface of the belt, in that each brush element tip will apply a cleaning action on the surface of the belt which has a component extending along the width of the belt, and a further component extending along the longitudinal axis of the belt i.e. parallel to the direction of motion of the belt.

In an alternative arrangement, the cylindrical cleaner may comprise a cylindrical core having wiper-type cleaning elements mounted on the outer surface of the core e.g. elastomeric wiper or scraper blades set into the surface of the core.

Preferably, a similar supporting arrangement is provided at each end of the drive roller and the cylindrical cleaner, in that the drive roller and the cylindrical cleaner each extend throughout the width of the return run of the endless belt, and are mounted in respective cradles to be arranged one at either side edge of the return run.

According to a further aspect of the invention, there is provided a cleaning device for an endless conveyor of the type comprising an endless belt or the like having an upper conveyor run and a lower return run which are guided over rollers at each end of the conveyor, said cleaning device being arranged to exert a cleaning action on the underside of the return run of the conveyor belt and to be driven directly or indirectly by the linear motion of the conveyor belt and/or from a drive train coupled with the conveyor belt, and in which the cleaning device comprises:

- a rotatable cleaner having its axis of rotation extending below the return run and transversely of the direction of travel of the return run, said cleaner having cleaning elements extending outwardly of said axis and in which the outer ends of the elements are engageable with the underside of the return run upon rotation of the cleaner;
- a cradle on which the cleaner is rotatably mounted;
- means permitting adjustment of the spacing of the cleaner axis relative to the underside of the return run; and,
- biasing means for urging the cleaner axis towards the underside of the return run to press the outer ends of the cleaning elements into cleaning contact therewith.

The transmission of drive to the cleaner may take any convenient form, which can be taken, directly or indirectly, from the linear motion energy of either run of the conveyor belt; or from the drive train to the conveyor belt e.g. from a drive or driven roller at one end of the conveyor. The cleaner preferably comprises a rotary brush having a cylindrical core and brush element mounted on the core and extending outwardly of the brush axis.

Regardless of the means adopted, no separate or dedicated power source is required to drive the brush, and which therefore derives necessary power input (directly or indirectly) from any convenient source of energy already available to drive the conveyor.

By reason of the means of adjustment of the spacing of the brush axis from the underside of the return run, and also the biasing means, the outer ends or tips of the cleaning elements can engage the underside of the return run with a sufficient cleaning action despite variation in types or volumes of material adhering thereto.

The adjustment means and the biasing means also provide automatic adjustment of the axis of the rotatable brush, to compensate for wear of the tips of the cleaning elements, so that greater utilisation of the brush can be achieved, without need of adjustment manually, until such time as the brush is worn down to a sufficient extent to require complete replacement.

The adjustment means may comprise a means of adjustment of the brush axis relative to the cradle and/or a means of adjustment of the cradle relative to the conveyor runs.

The biasing means may comprise a spring biasing arrangement, but more preferably comprises a gravity acting biasing load arranged to exert an upward force on the brush via its mounting on the cradle.

In its simplest form, a single cradle may mount one end of the brush e.g. rotatably mount one end of a longitudinal drive shaft of the brush on which the cleaning elements are mounted, but preferably a pair of cradle assemblies are provided, each rotatably mounting a respective end of the brush shaft.

The or each cradle may comprise an upright support plate extending perpendicular to the plane of the conveyor runs, and conveniently the plate may be rotatably mounted on one end of a shaft on which one of the belt rollers e.g. a drive roller is mounted.

Preferred embodiments of cleaning device for endless conveyors will now be described in detail, by way of example only, with reference to the accompanying drawings, in which:

FIG. 3a is a view, similar to FIG. 2, and showing a cleaning device according to the invention arranged to be driven via a non-driven idler roller at a discharge end of an endless conveyor;

FIG. 3b is an end view corresponding to FIG. 3a;

FIG. 4a is a schematic illustration of application of a cleaning device according to the invention to a conveyor belt, in order to transfer conveyed material to one or both sides at, a specified location along the length of the conveyor;

FIG. 4b is a plan view corresponding to FIG. 4a;

FIG. 5a and FIG. 5b are, respectively, side view and plan view of a rotary helical brush element for cleaning both a roller and a conveyor belt simultaneously, and discharging any waste to one or both sides of the conveyor;

FIG. 6a is an end view of a rotary brush type cleaning element according to the invention, designed to transmit gas or fluid through the element to assist in the cleaning operation;

FIG. 6b is an end view corresponding to FIG. 6a;

Figure 1:
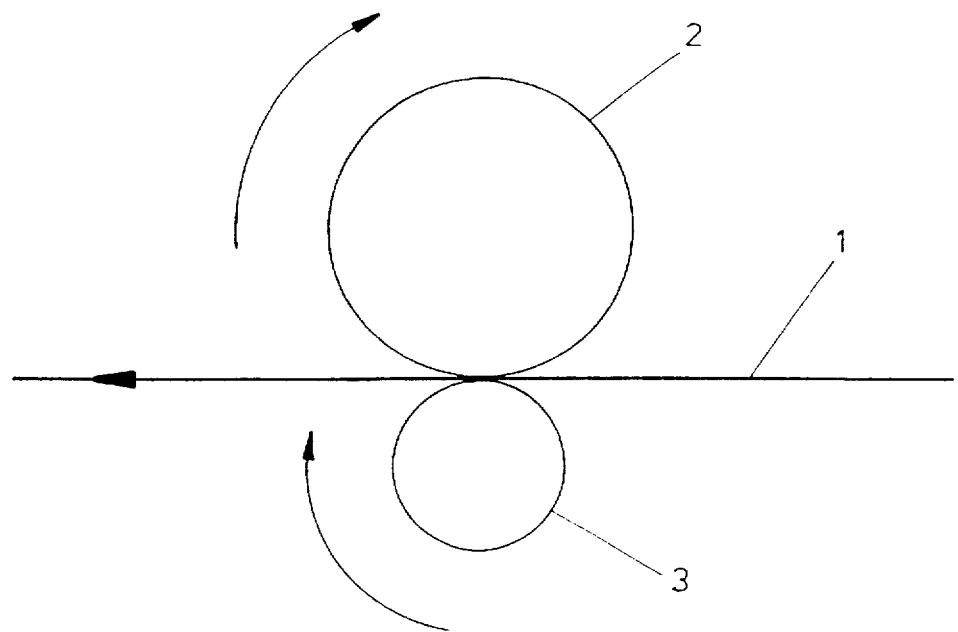
FIG. 1 is a diagrammatic illustration of the underlying principle of operation of a cleaning device according to the invention.

Referring first to FIG. 1 of the drawings, there is shown an endless conveyor belt 1 driving an idler roller 2, the rotation of which is transmitted to a driving belt pulley 3. Pulley 3 can be mounted on the outer end of a shaft 4 by a key or other transmission device 5 as shown in FIG. 2 or FIG. 3a.

Figure 2:
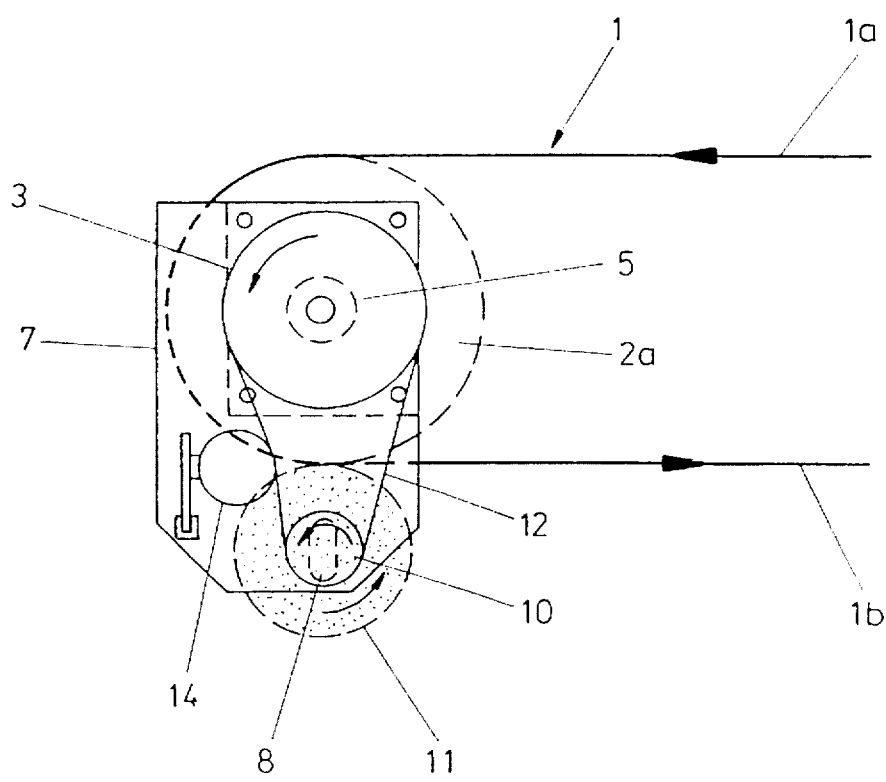
FIG. 2 is a side view illustration of the application of power transmission from a conveyor belt driving drum to a rotatable cleaning device according to the invention.

Referring now to FIG. 2, this shows in more detail an embodiment of cleaning device according to the invention and its manner of mounting adjacent to a lower return run of an endless conveyor. The endless conveyor 1 has an upper conveying run 1a, and a lower return run 1b, and an endless belt 1 is guided over rollers at each end of the conveyor, one of which is shown by reference numeral 2a in FIG. 2, and which is assumed to be a drive roller or drum. Pulley 3 is therefore driven by the roller 2a, and transmits rotation to a smaller pulley 10 via endless belt 12 in order to transmit drive to the cleaning device.

The cleaning device is arranged to exert a cleaning action on the underside of the return run 1b of the conveyor belt, and in the embodiment of FIG. 2 is driven by the drive train coupled with the conveyor belt, in that roller 2a transmits drive via pulley 3 and pulley 10 in order to apply a stepped-up transmission ratio to a cylindrical cleaner in the form of rotatable brush 11. The brush 11 is mounted on a drive shaft 11a which extends below the return run 1b and perpendicular to the direction of travel of the return run. The brush 11 has cleaning elements or bristles extending outwardly of the axis of shaft 11a, and the outer ends of the elements are engageable with the underside of the return run 1b upon rotation of the brush 11.

Brush 11 is rotatably mounted between a pair of cradle assemblies arranged one at either side of the conveyor, with each cradle rotatably mounting a projecting end of shaft 11a. Each cradle comprises a mounting plate 7 which is mounted on a projecting stubshaft end of roller shaft 4, on which pulley 3 also is mounted.

Evidently, the counter clockwise rotation of the cleaning elements of brush 11 comprises a linear motion, at their tips, which is directly opposed to the linear motion of the return run 1b, and this provides a vigorous and efficient cleaning operation of the underside of the return run 1b.

The ends of brush shaft 11a are mounted in bearings 6 secured to the cradle or mounting frame 7, and which are retained to be slidably adjustable vertically in a guide slot 8, when it is desired to adjust the spacing of the axis of the shaft 11a from the underside of return run 1b i.e. to increase or decrease the cleaning force applied by the tips of the rotating cleaning elements of brush 11.

Although not shown in detail in FIG. 2, or FIGS. 3a and 3b, biasing means is provided to urge the axis of the brush 11 (shaft 11a) towards the underside of the return run 1b and thereby press the outer ends of the cleaning elements into cleaning contact therewith. The biasing means may comprise a spring biasing arrangement, or more preferably a gravity acting biasing load which exerts an upward force on the brush shaft 11a via its mounting on the cradle assemblies.

By reason of the means of adjustment of the spacing of the brush axis from the underside of the return run, and also the biasing means, the outer ends or tips of the cleaning elements can engage the underside of the return run with a sufficient cleaning action despite variation in types or volumes of material adhering thereto. Automatic adjustment for brush wear also can be achieved, so that the brush axis is progressively advanced upwardly towards the underside of the return run 1b as the cleaning element tips wear down, and this can be allowed to continue until such time as complete replacement of the brush is required.

Each driven pulley 10 is keyed to the stubshaft end of brush shaft 11a, and is driven by belt 12, and a tensioning pulley 14 presses against one run of the belt 12 to apply tension in the belt sufficient to ensure adequate drive between drive pulley 3 and driven pulley 10, but in addition the pulley 14 applies sufficient tension to the belt 12 so as to be capable of lifting the rotary brush 11 and its attached assembly of components upwardly within slot 8, so as to ensure a desired pressure of contact between the underside of lower run 1b of the conveyor belt and the tips of the cleaning elements of the rotary brush 11.

FIG. 2 and FIGS. 3a and 3b show a rotary cleaning device according to the invention arranged to be driven by a discharge roller at a discharge end of an endless conveyor, and the discharge roller can be a driving drum, or an idler roller configuration as necessary.

FIGS. 4a and 4b show a modified form of helical rotary brush 16 which is operable in order to discharge material cleaned from the upper surface of the lower run of conveyor belt 1 in a direction laterally of the direction of travel of the conveyor belt, to provide discharge at any specified point along the length of the conveyor. Lateral discharge therefore can be achieved to either side of the conveyor belt if required.

FIGS. 5a and 5b show an alternative mode of use of helical brush 16, which applies a rotary cleaning action to the upper surface of lower conveyor run 1b, and simultaneously applies a cleaning action to the cylindrical face of roller 2, and which can discharge cleaned material to one or other side of the conveyor as required.

Referring to FIGS. 6a and 6b, this shows diagrammatically the concept of applying a fluid e.g. gaseous or liquid cleaning medium to the rotary brush in order to assist the cleaning action. The fluid may be applied internally of the drive shaft of the brush 11 via inlet valve 17, and is discharged radially outwardly through the cleaning elements of brush 11 via discharge jets 18. A rotary seal 20 enables the fluid medium to enter the shaft without leakage, and a distributor 19 ensures that the medium is directed to the required discharge jets 18.

Figure 7:
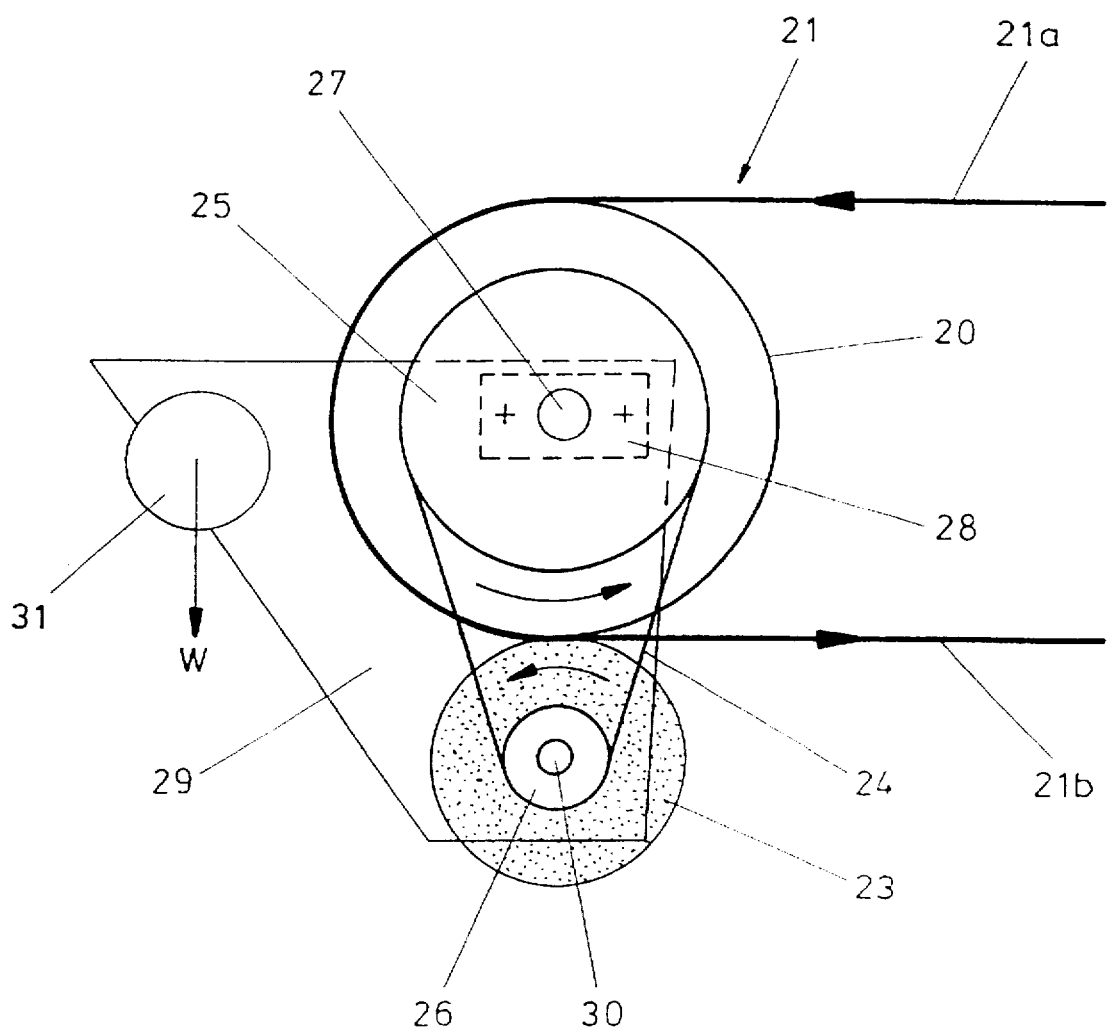
FIG. 7 is a schematic side view of an other embodiment of cleaning device according to the invention, adjustably mounted on a roller drive shaft of an endless conveyor.

Referring now to FIG. 7 of the drawings, this shows a further embodiment of the invention, and which includes biasing means for applying an upward biasing force to the brush in order to press the cleaning elements into required pressure contact with the underside of the return run of the conveyor.

The endless conveyor belt 21 has an upper conveyor run 21a and lower return run, 21b, a return end drive roller 20 around which the conveyor belt 21 is taken, a drive pulley 25 keyed to roller shaft 27, driven pulley 26 coupled with drive pulley 25 via transmission belt/chain 24, and rotary brush 23 arranged to be driven via driven pulley 26.

A side mounting plate or cradle assembly 29 is provided at each side of the conveyor belt and each assembly 29 is pivotally mounted on a respective projecting end of roller shaft 27. Reference 28 designates a pivot plate bearing assembly which pivotally mounts a cradle assembly 29 on shaft end 27.

The cradle assembly 29 is therefore capable of pivoting about the axis of shaft 27, in order to vary the spacing between the shaft axis 30 of brush 23 and the underside of the return run 21b. This enables the tips of the cleaning elements of rotary brush 23 to be adjusted to a position of desired cleaning contact with the underside of the return run 21b, and in addition enables wear of the cleaning elements to be compensated for automatically.

Biasing means is provided in the form of a gravity biasing arrangement, to apply a constant anti-clockwise moment to the cradle assembly 29 and thereby urge the axis 30 of brush 23 along an upward arc of movement which includes a component upwardly towards the underside of the return run 21b. The biasing means comprises a mass 31 spaced to the left of the axis of shaft 27 so as to apply the required anti-clockwise turning moment to cradle assembly 29.

If it is required to increase the cleaning force, a larger weight may be applied, and evidently automatic adjustment takes place in the event of wear of the tips of the cleaning elements. Mass 31 is shown schematically only, and as an alternative a biasing force may be provided comprising a spring arrangement and/or a combination of a weight and spring arrangement.

As an alternative, the mass 31 may be omitted, and a manually operated adjustment device (not shown) may be provided to adjust the angular setting of the cradle 29 about the pivot axis (shaft 27), to provide required frictional engagement between the brush and the underside of the belt.

Figure 8:
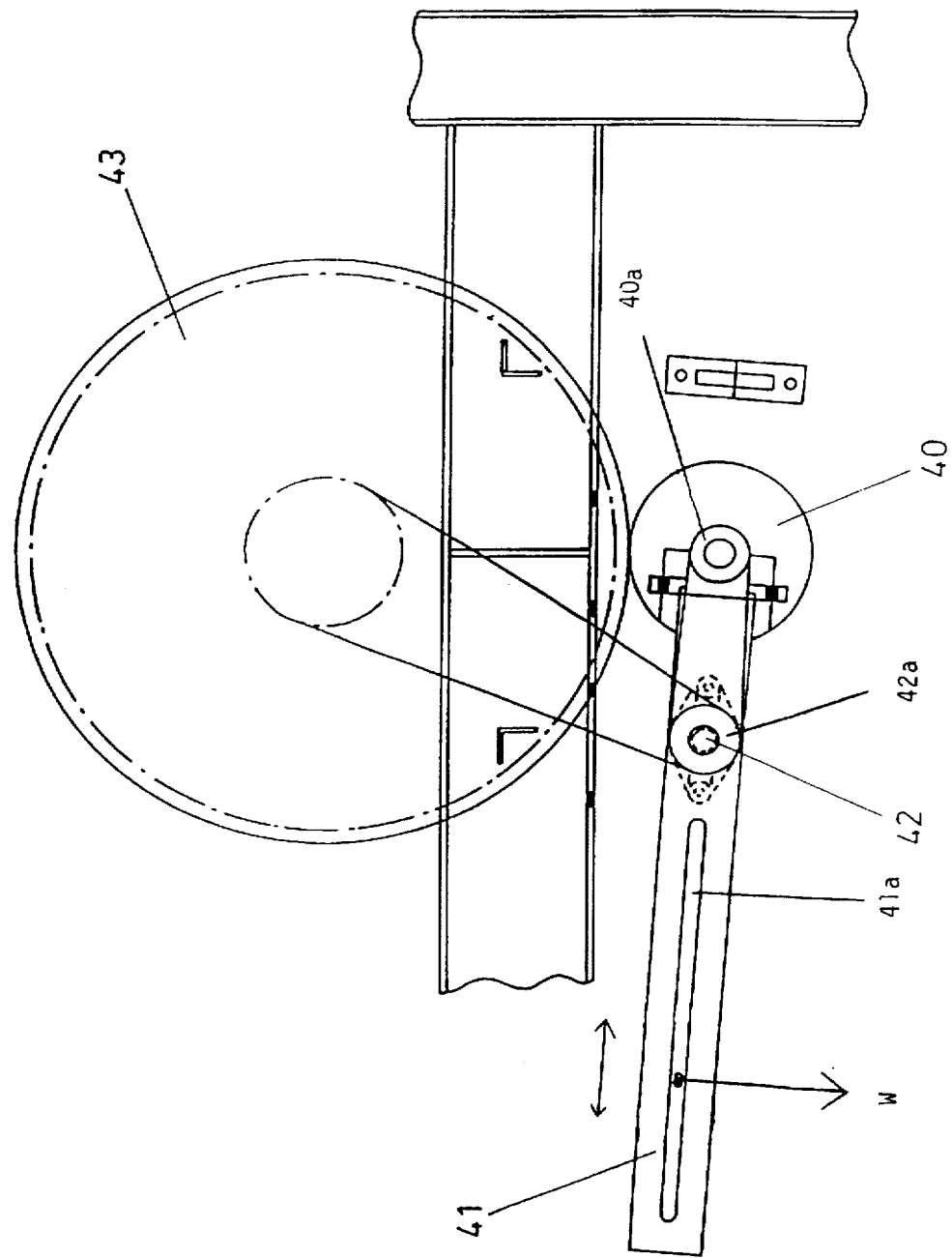
FIG. 8 is a side view of a further embodiment of cleaning device according to the invention.
Figure 9:
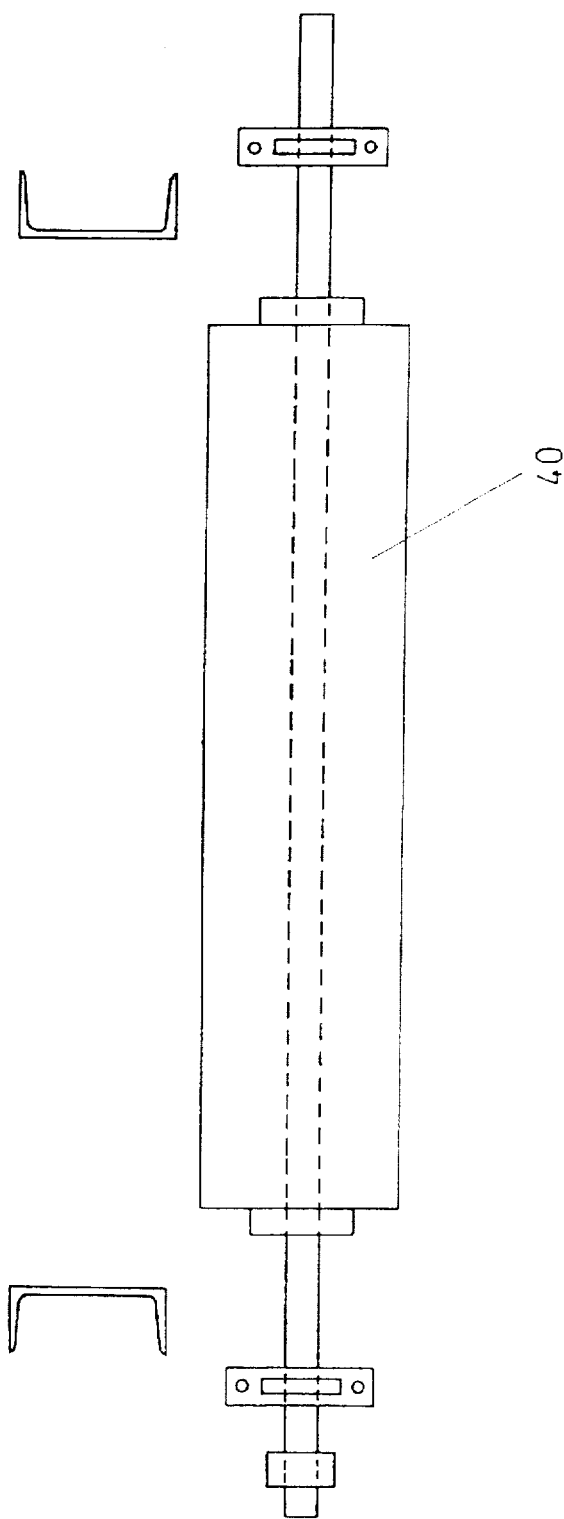
FIG. 9 is an end view corresponding to FIG. 8.
Figure 10:
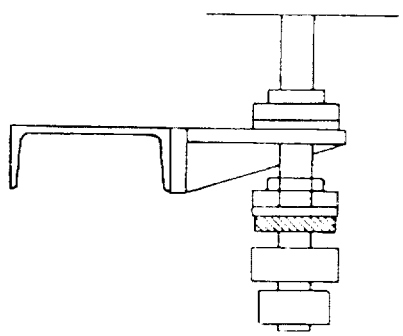
FIG. 10 is a sectional view through a pivot mounting of a cleaning roller assembly shown in FIGS. 8 and 9.

Finally, referring to FIGS. 8 to 10 of the drawings, this shows an arrangement in which a cylindrical rotatable brush 40 is upwardly biased into cleaning contact with the underside of a return run of an endless conveyor belt (not shown), by being mounted on one end of a lever arm 41 having a pivot axis 42. Any suitable downward load is applied to lever arm 41 in order to apply an upward force on the shaft on which brush 40 is mounted. This may comprise a load W, adjustably located at any required position along the length of guide slot 41a.

A large roller drum 43 is shown, around which the conveyor belt is taken at one end of the conveyor, and rotary drive is transmitted from drum 43 to rotary brush 40 via a double pulley/belt arrangement as illustrated, namely primary drive to pulley 42a, and secondary drive from pulley 42a to pulley 40a.

Also, although not shown, the primary drive for the cleaning brush may be derived from any rotary drive which is arranged to drive, or to be driven by the endless conveyor belt.

Adjustment of the position of the weight W enables the pressure exerted by the tips of the brush element to be varied to suit requirements.

Furthermore, if any "out of balance" forces should be generated, they are effectively "lost" or nullified within the pivot point.

Although it is a preferred aspect of the invention to locate the rotary brush below the return run of the conveyor, it is within the scope of the invention to locate the brush between the upper and lower conveyor runs (to clean the underside of the upper run and/or the upper side of the lower run); or to locate it above the upper run, preferably operating in combination with a "plough" to distribute material e.g. coal into a bunker.

In these preferred variations within the scope of the invention, the brush will be mounted in such a way that the spacing of its axis can be adjusted, and with a biasing force in addition, in order to apply the tips of the cleaning elements of the brush into required cleaning contact with the surface(s) of the endless conveyor which is to be cleaned.

Figure 11:
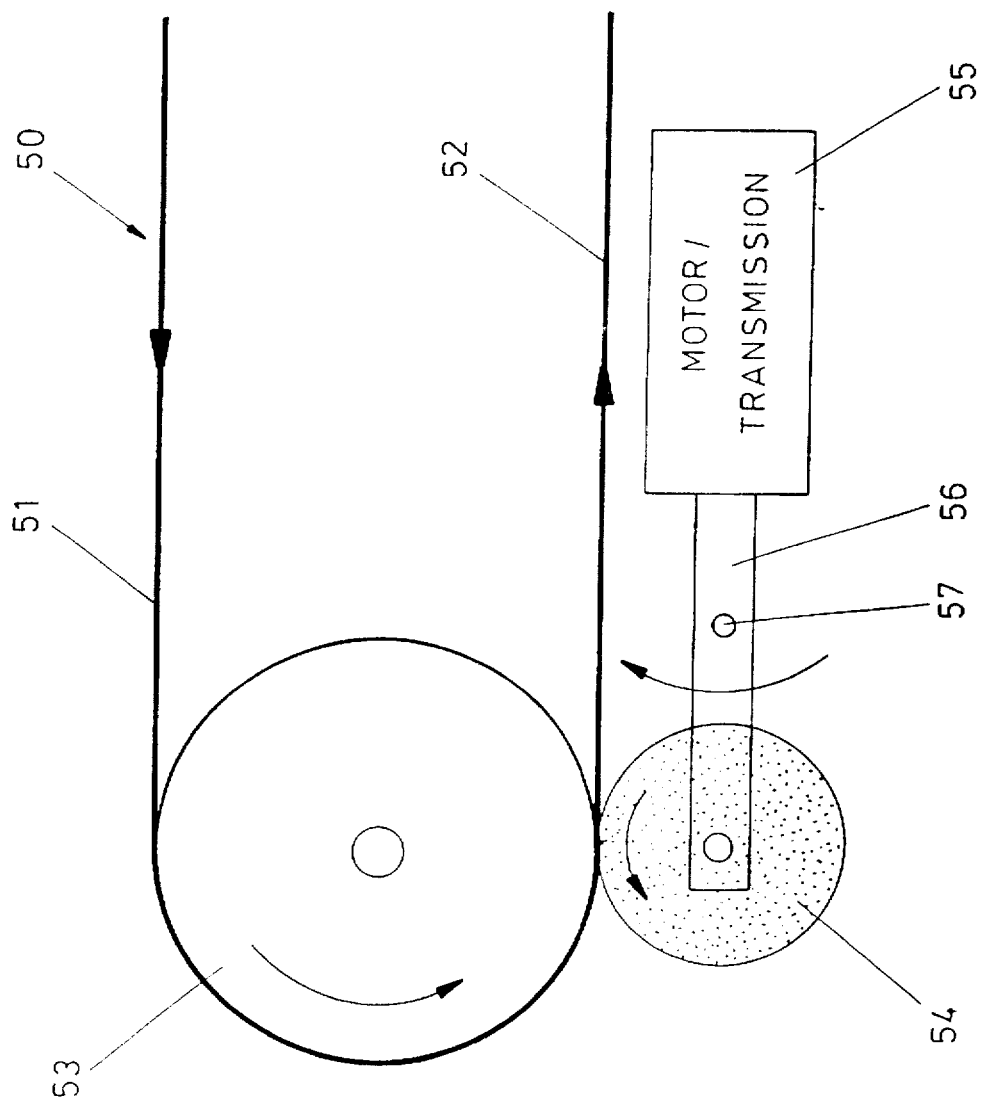
FIG. 11 is a schematic illustration of a still further embodiment of the invention.

A still further embodiment of the invention is shown in FIG. 11, which shows an alternative means of driving the rotary brush, and also of applying a biassing force to urge the brush upwardly into contact with the lower surface of the return run of the conveyor.

The embodiment of FIG. 11 is different from the other embodiments, in that it does not rely, directly or indirectly, upon the motion energy of the endless conveyor, or the drive transmission providing input energy to the endless conveyor, but has its own separate motor/transmission unit. In addition, the motor/transmission unit is mounted in such a way, relative to the brush, that the mass of this unit applies the necessary upward biassing force to the brush to urge the latter continuously to engage the under side of the return run of the conveyor.

Referring now to FIG. 11 in more detail, this shows an endless conveyor belt designated generally by reference 50, having upper run 51, lower return run 52, and a drive/driven end drum 53 over which the belt is taken. A rotary cleaning element in the form of a brush 54 is mounted below the underside of the return run 52, and is driven in the direction counter to the direction of movement of the return run 52 by a motor/transmission unit 55. This may comprise an electric motor and drive unit, a hydraulic motor, or any other suitable drive transmission means.

FIG. 11 shows schematically, brush 54 and unit 55 mounted at opposite ends of a support beam 56, and itself mounted on a horizontal pivot 57. The unit 55 therefore applies a clockwise turning moment to the beam 56 about pivot 57, thereby applying continuous upward biassing force on the brush 54 so that its cleaning elements press continuously against the underside of the return run 52. This assists the cleaning action, and also provides automatic compensation for wear of the cleaning elements.

Figure 12:
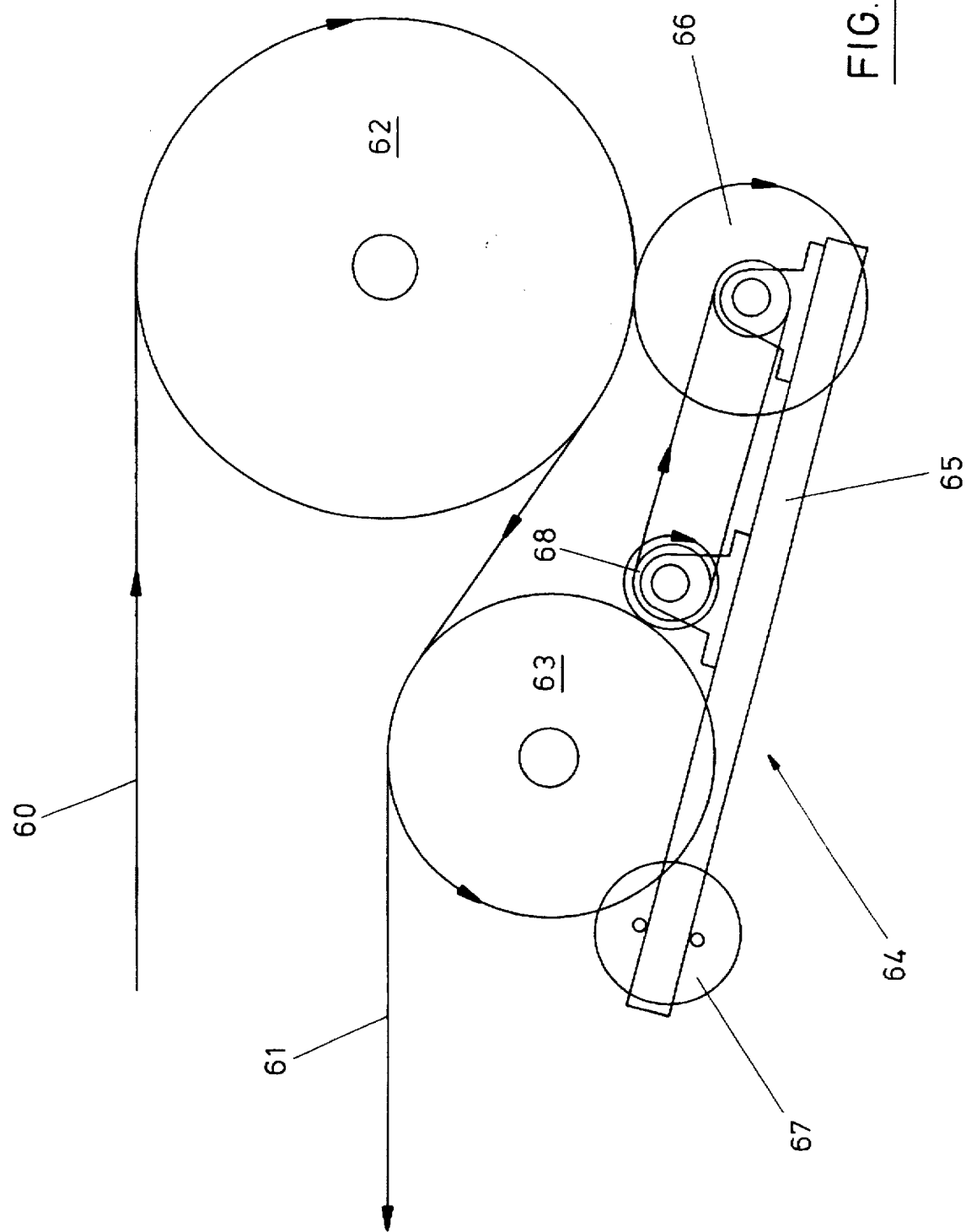
FIG. 12 is a schematic illustration of another embodiment of the invention.

Referring to FIG. 12 of the drawings, this shows schematically another embodiment of the invention, in which drive to operate the cleaning mechanism is derived from part of the roller system of the endless conveyor belt which is to be cleaned. FIG. 12 shows an endless conveyor belt having an upper working run 60, a lower return run 61, and a head drum 62 around which the endless conveyor belt is taken. Part of the roller system of the endless conveyor belt comprises a usual "snub" roller 63, which is located closely adjacent to the head drum 62, and engages the underside of the return run 61 in known manner. The purpose of the snub roller 63 is to increase the extent of circumferential contact between the endless conveyor belt and the head drum 62,
and thereby increase the gripping torque which can be transmitted to the endless conveyor belt. In addition, the snub roller 63 reduces the vertical separation between the working run 60 and the return run 61.

The embodiment of cleaning device according to the invention, shown in FIG. 12, is designated generally by reference 64, and comprises a cradle 65 which carries, at one end, rotary brush 66, which may be a helical arrangement of bristles, and carries at its other end a counterweight 67 which applies an upward biasing force to the brush 66 to maintain it in contact with the underside of the return run 61 of the conveyor belt.

Approximately mid-way between brush 66 and counterweight 67, there is arranged a transfer roller 68 arranged to be driven by frictional contact with snub roller 63, and which transmits rotation to brush 66 via a belt and pulley arrangement, or any other convenient means. The central axis of transfer roller 68 also forms a pivot axis about which the cradle 65 can pivot, whereby counterweight 67 applies an ante-clockwise turning moment to the brush 66 about the axis of roller 68.

If the snub roller 63 is a lagged drum, then preferably transfer roller 68 will be a steel roller. Conversely, if snub roller 63 is made of steel, then transfer roller 68 may be lagged.

Therefore, the rotary drive to brush 66 is derived from the linear movement of the endless conveyor belt, by transmission of rotation from snub roller 63 and transfer roller 68.

Although not shown, suitable means will be provided to mount cradle 65 closely adjacent to the underside of the return run of the conveyor belt, and to engage drivingly with the snub roller 63.

Finally, particularly preferred embodiment of cleaning device according to the invention will now be described with reference to FIGS. 13 to 16 of the drawings. The cleaning device is designated generally by reference 100 and is shown mounted near the upper return end 101 of a troughed belt conveyor of the type used in coal mines, and having an endless belt with an upper conveyor run 102 carrying a load 103, and a lower return run 104. The conveyor runs are guided over rollers at each end of the conveyor, of which only upper return end roller 105 is shown, and usually a series of intermediate idler rollers are provided throughout the length of the conveyor, as will be well-known to those of ordinary skill in the art. The upper conveyor run 102 discharges the load 103 into discharge chutes to be transferred to any desired location. Therefore, after passing over the end roller, 105, what was previously the upper surface of upper conveyor run 102 is now the lower downwardly facing surface of return run 104, and it is at this position where preferably cleaner device 100 is located.

The endless conveyor belt is usually fabricated of rubber, or other suitable elastomeric material, with textile reinforcement, and normally runs with the belt under substantial tension, and especially under load, so that there is little sagging of the conveyor runs. In any event, the cleaner device 100 is arranged close to the upper return end 105, and acts on a portion of the endless belt which is maintained under tension.

Cleaner device 100 is arranged to exert a cleaning action on the underside of the return run 104 of the conveyor belt, as shown, and is driven directly by the linear motion of the conveyor belt, as will be described in more detail below. The cleaning device 100 therefore comprises a cradle assembly supporting each end of the drive and cleaning components of the device, and although only one cradle assembly is illustrated, mounted adjacent one side edge of the return run 104, it should be understood that a similar cradle assembly will be provided adjacent to the opposite side edge of the return run.

Cleaning device 100 comprises a cradle 106 which is adapted to be mounted pivotally adjacent to the side edge of the path of travel of the return run 104, and rotatably mounts a drive roller 107 which is engageable frictionally with the upper surface of the return run 104 so as to be rotated by the linear motion of the belt. The cradle also rotatably mounts a generally cylindrical cleaner 108, and which is provided with cleaning elements extending outwardly of the axis of rotation of the cleaner and engageable with the lower surface of the return run 104.

Drive means is housed within the cradle 106, and preferably taking the form of a chain or toothed belt drive, and which transmits input power from drive roller 107 to the cleaner 108. This rotates the cleaner 108 in a direction such that the tips of the cleaning elements move in an opposite direction to the linear movement of the return run 104 as the elements carry out a cleaning operation. The peripheral speed of the tips of the cleaning elements, in a tangential direction, may be up to twice the linear speed of the endless belt, although this can be varied with experience, according to the nature of the material to be cleaned, the surface of the belt, and the type of cleaning elements employed.

Figure 14:
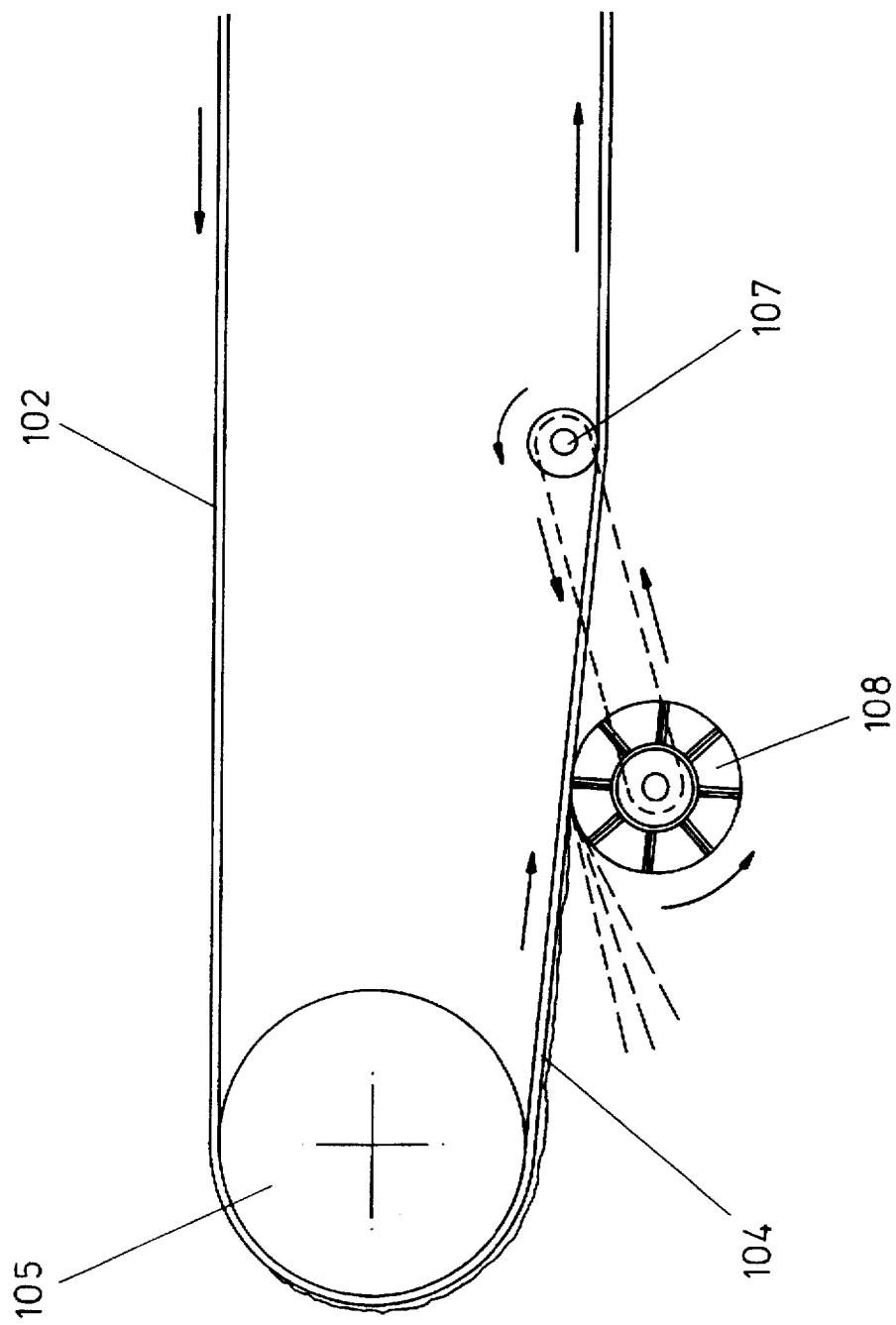
FIG. 14 is a schematic side view of the embodiment show in FIG. 13.

The transmission of rotary input power to the cleaner 108 will result in anti-clockwise rotation, as can be seen particularly from FIG. 14, and this will tend to cause the cleaner 108 to move away from the surface of the belt, by torque reaction. This would be permitted, by reason of the pivotable mounting of the entire cradle assembly. However, to maintain a pressing force of the cleaner 108 against the underside of the return run 104, biasing means is arranged to apply a biasing moment to the cradle 106 about its pivot axis, which urges the cylindrical cleaner 108 upwardly and thereby press the tips of the cleaning elements into engagement with the lower surface of the return run.

Figure 13:
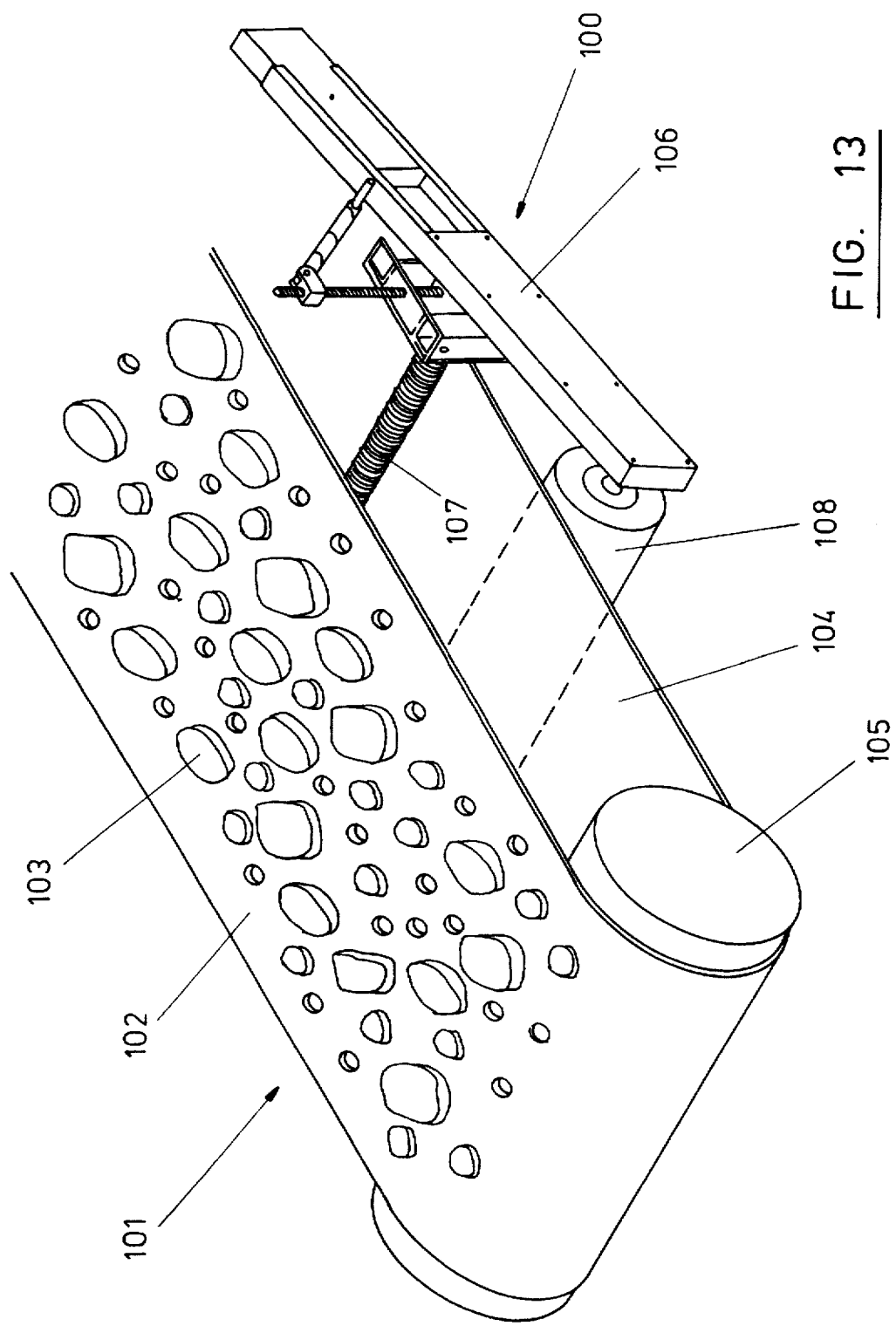
FIG. 13 is an isometric view of a final preferred embodiment of cleaning device according to the invention.
Figure 15:
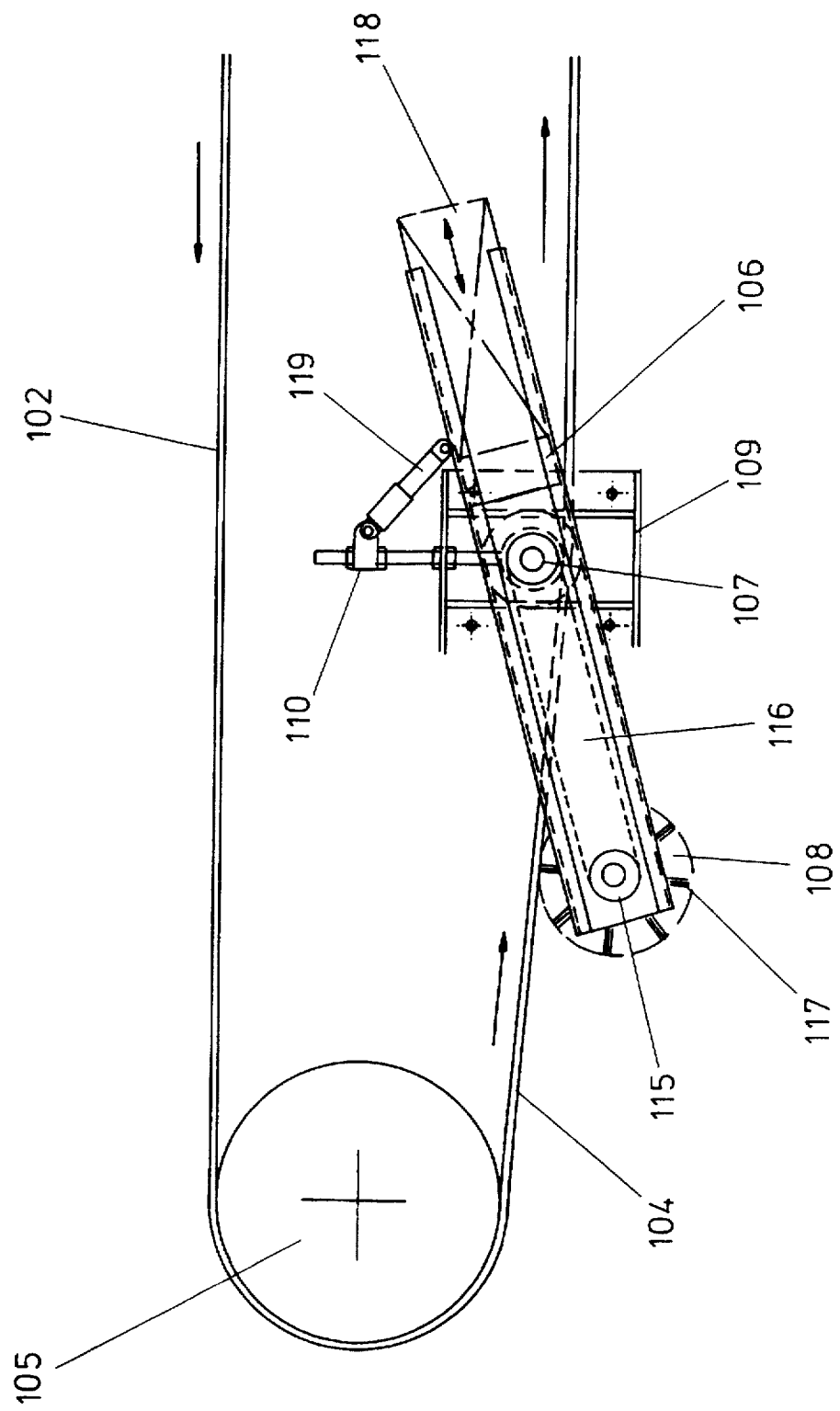
FIG. 15 is a view, similar to FIG. 14, and showing the constructional details of the embodiment in more detail.
Figure 16:
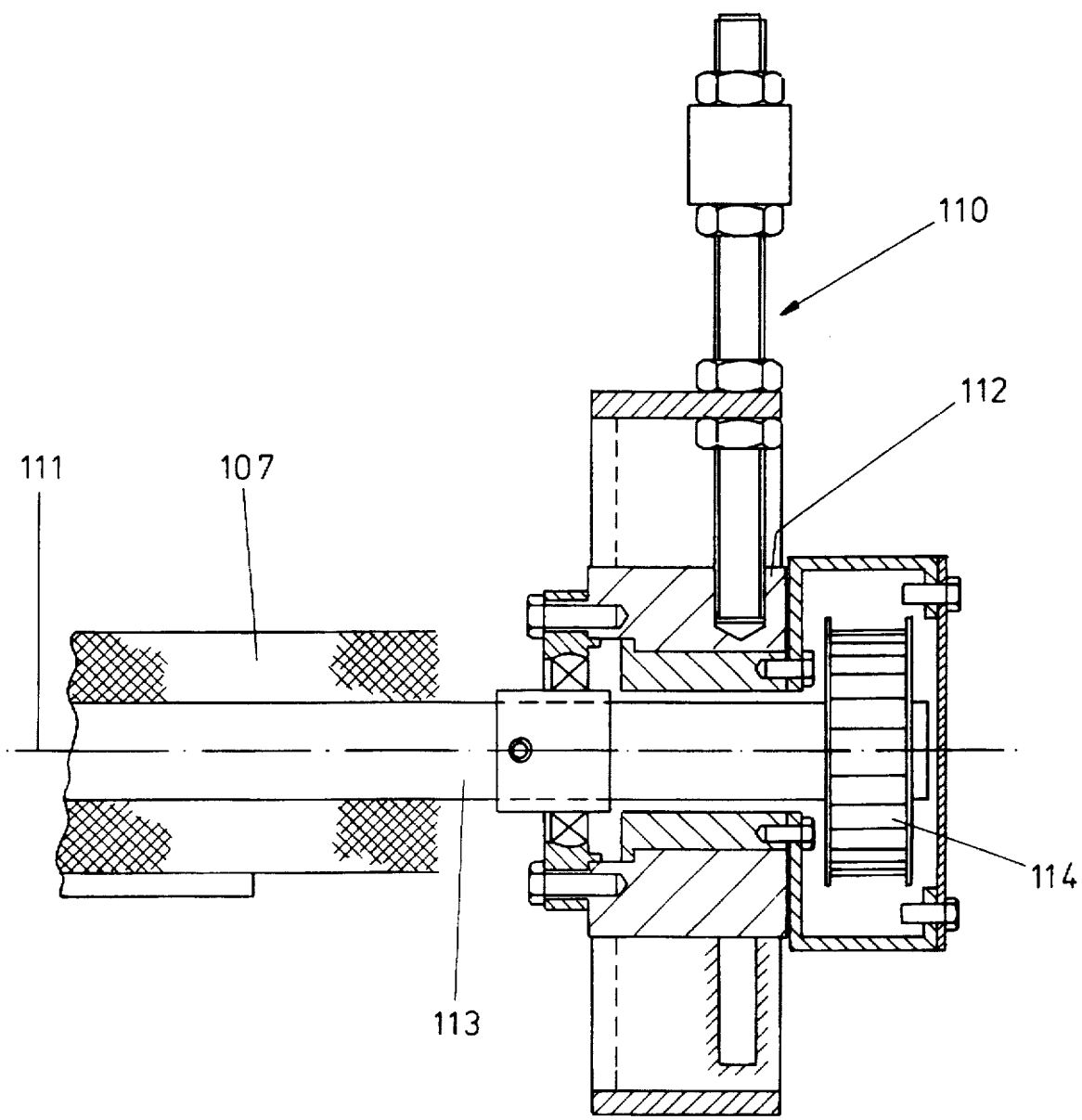
FIG. 16 is an end view, partly in section, of an input drive roller and its means of mounting in a cradle assembly of the final embodiment, and which transmits power input to operate the cleaning device.

FIG. 13 is a schematic illustration only, and greater detail of the operating components of the cleaner can be seen in FIGS. 14 to 16. In particular, the means of mounting the cleaner device 100 alongside the lower run 104 can be seen in more detail in FIG. 15, in which cradle 106 is pivotably mounted in a support bracket 109 in such a way that the input roller 107 can make desired pressure contact with the upper surface of return run 104. An adjustment device 110 allows the axis 111 of drive roller 107 to be adjusted upwardly or downwardly, by raising or lowering a bearing housing assembly 112 in which a drive shaft 113 of input roller 107 is rotatably mounted. A drive sprocket 114 is mounted on the end of shaft 113, and transmits drive to drive sprocket 115 of rotary cleaner (brush) 108 via toothed belt 116.

Therefore, as can be seen particularly in FIG. 15, the entire cradle assembly 106 can pivot about the axis 111 of input drive roller 107, and this provides a sensitive arrangement in which the tips of the cleaning elements 117 (see FIG. 15) of the brush 108 can engage the lower surface of return conveyor run 104 with sufficient cleaning force to remove dust, debris and other particles adhering to the conveyor belt, but if any excessive load remains adhering to the belt, or in the event of excessive belt roughness being encountered, the entire cradle assembly can pivot anticlockwise, and temporarily move the tips of the cleaning elements 107 away from the conveyor belt surface. This prevents damage being done to the assembly or the belt, and contributes to enhanced life of the cleaning elements. However, any required biasing moment will normally be applied to the cradle assembly, to maintain any suitable pressing force on the brush 108 against the conveyor belt surface, to suit particular operating conditions. The biasing means preferably takes the form of a counterweight 118, which is adjustably mounted on cradle 106, via a slidable mounting, whereby the distance of counterweight 118 from the pivot axis can be varied to suit requirements. In addition, a hydraulic: or other damper 119 reacts between adjustment device 110 and the cradle 106, so as to retard any oscillations applied to the cradle 106 about its pivot axis, and especially during start-up The cylindrical cleaner 108 preferably takes the form of a rotary brush , having a cylindrical core with brush elements extending outwardly of the core, and preferably the brush elements are wound helically onto the cylindrical core, so that upon rotation of the brush, the tips of the brush elements apply a cleaning action on the surface of the conveyor belt having two components, namely one component extending width-wise of the belt, and the other component extending along the axis of the belt.

However, other types of cylindrical cleaner may be provided, e.g. a cylindrical cleaner having a cylindrical core with wiper type cleaning elements mounted on the outer surface of the core e.g. in the form of rubber scraper blades.

The drive roller 107 and cylindrical cleaner 108 each extend throughout the width of the return run 104, and are mounted in respective cradles to be arranged one at either side edge of the return run.

I claim:

1. A cleaning device for an endless conveyor of the type comprising an endless belt having an upper conveyor run and a lower return run which are guided over rollers at each end of the conveyor, said cleaning device being arranged to exert a cleaning action on the underside of the return run of the conveyor belt and to be driven directly by the linear motion of the conveyor belt, and in which the cleaning device comprises:

a cradle adapted to be mounted pivotally adjacent to the path of travel of the return run of the endless belt, said cradle having a pivot axis;

a drive roller rotatably mounted on said cradle and engageable frictionally with the upper surface of the return run to be rotated by the linear motion of the belt, said drive roller having an axis which coincides substantially with the pivot axis of the cradle;

a generally cylindrical cleaner also rotatably mounted on said cradle and having cleaning elements extending outwardly of the axis of rotation of the cleaner and to be engageable with the lower surface of the return run;

drive means interconnecting said roller and said cylindrical cleaner, and operative to rotate the cleaner in a direction such that the tips of the cleaning elements move in an opposite direction to the linear movement of the return run as the elements carry out a cleaning operation; and biasing means arranged to apply a biasing moment to the cradle about its pivot axis to urge the cylindrical cleaner upwardly and thereby press the tips of the cleaning elements into engagement with the lower surface of the return run.

2. An endless conveyor having one or more cleaning device according to claim 1.

3. A cleaning device according to claim 1, in which the biasing means comprises a counterweight mounted on the cradle at an opposite side of the pivot axis of the cradle to the cleaner.

4. A cleaning device according to claim 3, in which the counterweight is adjustably mounted on the cradle to permit variation in the biasing moment applied to the cradle.

5. A cleaning device according to claim 1, including a damper arranged to retard any oscillation of the cradle about its pivot axis.

6. A cleaning device according to claim 1, in which the cylindrical cleaner comprises a rotary brush having a cylindrical core and brush elements extending outwardly of said core.

7. A cleaning device according to claim 6, in which the brush elements are wound helically onto said cylindrical core.

8. A cleaning device according to claim 1, in which the cylindrical cleaner comprises a cylindrical core having wiper-type cleaning elements mounted on the outer surface of said core.

9. A cleaning device according to claim 1, in which the drive roller and the cylindrical cleaner each extend throughout the width of the return run of the endless belt, and are mounted in respective cradles to be arranged one at either side edge of the return run.

10. A cleaning device for an endless conveyor of the type comprising an endless belt or the like having an upper conveyor run and a lower return run which are guided over rollers at each end of the conveyor, said cleaning device being arranged to exert a cleaning action on the underside of the return run of the conveyor belt, and in which the cleaning device comprises:

- a rotatable brush having its axis of rotation extending below the return run and transversely of the direction of travel of the return run, said brush having cleaning elements extending outwardly of the brush axis and in which the outer ends of the elements are engageable with the underside of the return run upon rotation of the brush;

- a support carrying and rotatably mounting said brush;

- a pivot mounting for said support and spaced from said brush; and

- drive means mounted on said support and spaced away from said pivot mounting in an opposite direction from said brush, whereby said drive means is effective to apply, by its mass, an upward biassing force to the brush via the support to press the cleaning elements of the brush into contact with the underside of the return run of the conveyor.

11. An endless conveyor having one or more cleaning device according to claim 10.

* * * * *